Aug. 31, 1965 J. C. MEIER 3,204,127

DIGIT MEMORY CIRCUIT

Filed July 12, 1963 2 Sheets-Sheet 1

INVENTOR.
JAMES C. MEIER

BY Moody & Anderson
AGENTS

INVENTOR.
JAMES C. MEIER

BY
Moody & Anderson
AGENTS

United States Patent Office 3,204,127

Patented Aug. 31, 1965

3,204,127
DIGIT MEMORY CIRCUIT

James C. Meier, Cedar Rapids, Iowa, assignor to Collins Radio Company, Cedar Rapids, Iowa, a corporation of Iowa Filed July 12, 1963, Ser. No. 294,492
6 Claims. (Cl. 307—88.5)

Figure 1:
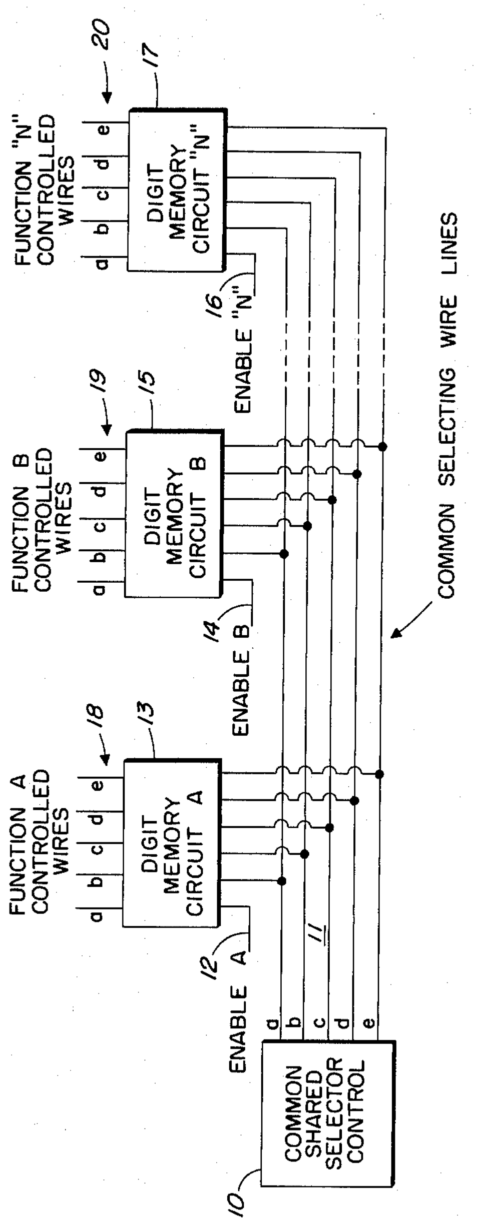

This invention relates generally to electronic remote control systems and more particularly to a logic switching system employing memory and control information regeneration capabilities.

A present trend in communication system development is one aimed toward what might be termed universal radio grouping whereby a plurality of translating units are designed with compatible characteristics which enable a wide degree of flexibility in combining basic functional units with common intercontrol using basic building blocks. Communication systems of this type possess unique remote control capabilities and might, for example, be controlled remotely by means which allow paralleling of command or follow-up equipments from a common-shared control station. Specifically, such systems may institute control functions by the presence or absence of grounds on input terminals to various components, with all components being controlled from a common-shared selector control line.

It is desired in any communication system that the interconnecting control lines be minimized. The universal radio grouping technique permits the various control functions to be accomplished by a common-shared control line upon which is provided various permutations of digit information such as particular combinations of a plurality of control wires being grounded, each combination commanding a particular function.

In order that a common control line may independently control a number of controlled devices, means must be provided at each controlled device to regenerate and retain the digital control information as a stored control function. In this manner, the selecting equipment, which generates the particular digital control information, may be used to provide a number of control functions to each of several controlled devices as a common-shared basis.

It is an object, therefore, of the present invention to provide a digital memory circuit capable of regenerating and storing digital input information of a momentary nature, and capable of retaining said control information in the absence of further external control in a system where common-shared control techniques are utilized.

A further object of the present invention is to provide the logic switching arrangement responsive to voltage remote control which allows paralleling of command or follow-up controlled units without restriction.

The present invention will be described in terms of an embodiment for use with coded digital information in the form of grounds on two of a set of five wires as used in a two-out-of-five wire-saving code.

Figure 2:
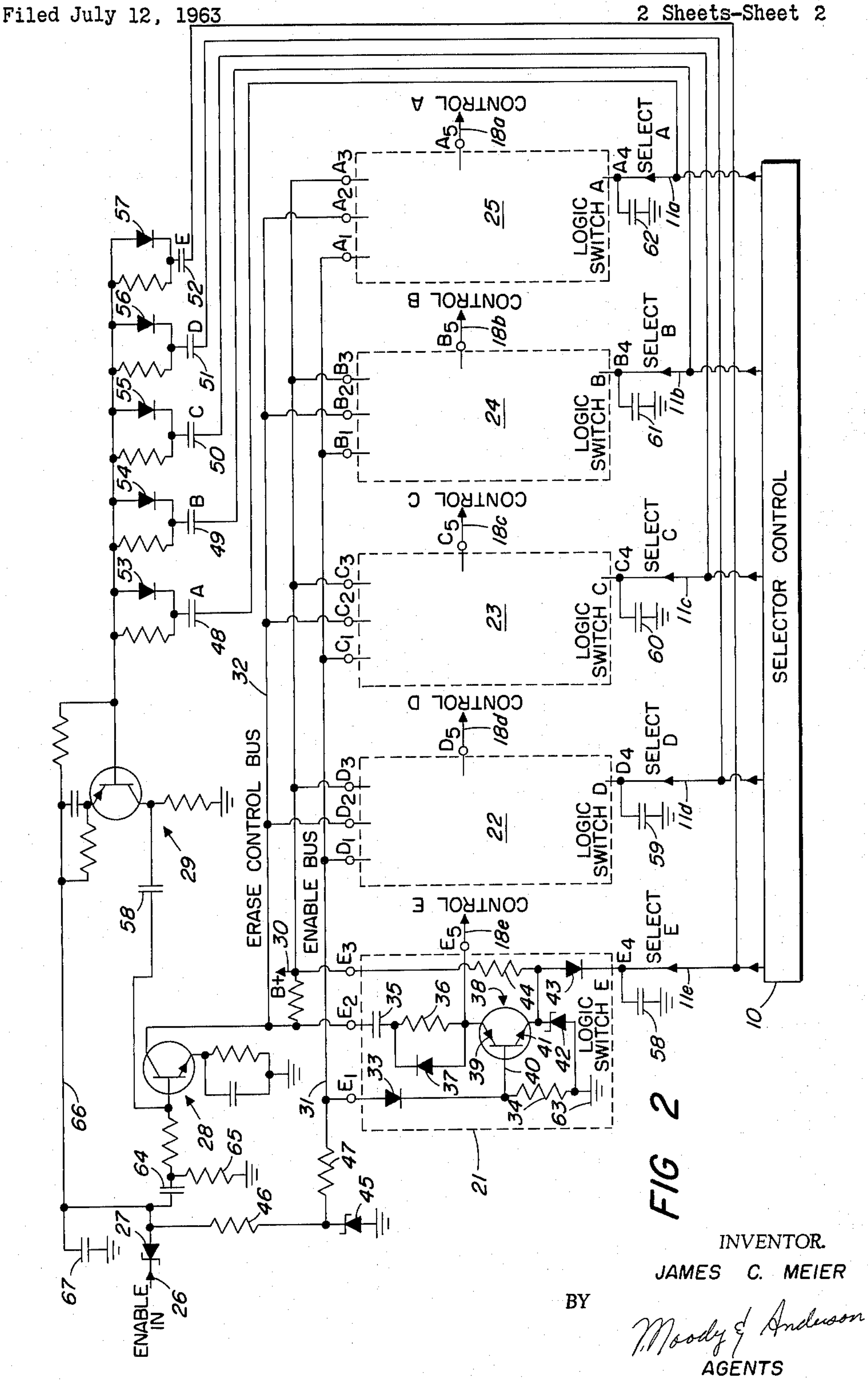

The present invention is in the form of a switching memory circuit, pluralities of which may be parallel connected to a common-shared set of five selecting wires. Each of the circuits is capable of storing input digital information under the control of an enabling signal and is nonresponsive to digital information on the input line in the absence of an enabling signal. Each of the digit memory circuits, in basic operation, regenerates and retains ground return permutations which are momentarily present on the input selecting lines during the time the particular circuit is enabled. The present invention will become more apparent on reading the following description in conjunction with the accompanying drawings in which;

FIGURE 1 is a generalized functional diagram of a communication or other system employing a plurality of digital memory circuits in accordance with the present invention under the control of a common digital information control line; and FIGURE 2 is a schematic diagram of the digital memory circuit in accordance with the present invention.

The present invention is herein illustrated as an embodiment for use with two-out-of-five coding wherein any one of five pairs of five wires are grounded to define ten discretely different control commands. The digital memory circuit embodied herein is capable of providing five direct current voltage return paths to ground of which any two at a time "remember" digital information conveyed to a system requiring two-out-of-five wire selection of ten digits.

Reference to FIGURE 1 illustrates a generalized system employing a plurality of memory circuits in accordance with the present invention. Each circuit shares a common input "line;" the line comprising five wires, various permutations of which may be grounded to provide digital control information. FIGURE 1 illustrates a common-shared selector control 10, the function of which provides momentary ground on various permutations of the selecting wires 11*a*–11*e*. Each of the memory circuits 13–15 . . . 17 receives the five-wire input. Memory circuit 13, in the presence of an enabling signal on input line 12 being simultaneously applied with the momentary ground permutations on lines 11*a*–11*e*, stores this information by regenerating and retaining ground paths on appropriate output lines 18*a*–18*e*. Memory circuit 15 also receives the momentary input digital information, but in the absence of the enabling voltage input 14 to circuit 15, the memory circuit 15 is not responsive to the input. Further memory circuits tied in common to the selecting lines 11 would in turn be nonresponsive to the digital information on the input lines 11 in the absence of an enabling pulse at the time the input ground information is applied. In this general manner, then, a plurality of memory circuits may be controlled by a common selector line.

The present invention is concerned with the novel logic and switching functions provided by the digital memory circuits of FIGURE 1. The input information from selector lines 11 and their time relationship with the individual enabling lines 12–14 . . . 16 are provided by the selector control 10, the functioning of which is not a part of the present invention. The selector control 10, for example, might be in the form of a telephone dial type selector which, in response to dialing a first number, might generate a particular two-out-of-five digital code along with enable voltage 12 to store this information in digital circuit 13. The dialing of a further number in selector 10 might then generate a further digital code on selector wires 11 along with an enable voltage 14 such that this coding is regenerated and stored in digital memory circuit 15, etc.

The output controlled wires 18*a*–18*e* . . . 20*a*–20*e* from each of the memory circuits 13, 15 . . . 17 are provided with regenerated and retained ground returns in permutations corresponding to the ground permutations initially applied on the selecting wires 11 coincident with the associated enable pulse. Such output information might be utilized in various diode switching matrices to accomplish, for example, the selection of a given crystal in an oscillator so as to tune a particular circuit to a particular frequency. A further memory circuit might provide output digital information to set up a corresponding injection oscillator frequency; while a still further circuit might select an appropriate transmitting or receiving antenna.

The utilization of the output information provided by the present invention does not form a part of the present invention. Numerous expedients are known in the art by which devices may be controlled by digital information in the form of permutations of grounded wires.

FIGURE 2 illustrates a schematic embodiment of a digital memory circuit in accordance with the present invention. As above mentioned, the described embodiment is one for use with a five-wire digital input information. It is to be realized that the present invention is not so limited and that any number of a plurality of *m* wires and various digital codes other than the two-out-of-five code may be utilized by obvious further extension of the circuitry to be described herein.

The functioning of the present invention might best be comprehended by first considering the functions which the circuit must perform, bearing in mind the common-shared input selection control as described with reference to FIGURE 1. When enable voltage and selecting grounds are applied, the circuit must generate appropriate ground paths and these paths must remain closed when the enable voltage and/or the momentary input selecting grounds are removed in either sequence. The sequence of initiation of either the enable voltage or the input-selecting grounds must not be important so long as the enable pulse and input selecting ground are coincident for some instant of time. When the enable pulse is applied alone, the enable pulse will cause the opening of any ground paths which were previously closed. Without an enable pulse being applied, any input select wire can be grounded without affecting any previously remembered (stored) ground paths. This latter function is necessary in order that a common-shared input line may be used for a plurality of such circuits. The application of a new input permutation of grounded wires to the circuit will erase the previously stored ground paths, assuming that the enable voltage is simultaneously applied. With the maintenance of an enable input pulse, continued reselection of input ground permutations may be effected with each selection erasing the previously selected permutation.

The above functions provide the versatility to enable a plurality of such digital memory circuits to be controlled from a common-shared input selecting line.

Referring now to the schematic of FIGURE 2, the present invention, considering a five-wire input embodiment, provides a plurality of voltage controlled switching means 21–25, one for each of the input selecting lines **11*a*–11*e*. Each of the voltage controlled switching means receives one of the input selecting lines 11*a*–11*e* and provides a corresponding output controlled line 18*a*–18*e*. For purpose of clarity, the schematic arrangement of switching means 21, 22, 23, 24 and 25 is shown only for switch 21. The circuitry for switching means 22–25 is identical to that illustrated for switching means 21. The controlled element of each of the switching means 21–25 is comprised of a solid state voltage controlled element for which a PNPN type silicon control switch 38 is illustrated. The operation of element 38 is similar to that of the vacuum tube thyratron. When the emitter 41 is negative with respect to the collector 39, and if a positive voltage is applied to the base 40, the switch 38 will turn on and remain on even after the positive base voltage is removed. When turned on, the emitter-collector path represents a very low impedance. The output controlled line 18*e* of switching means 21, during the conduction of the switch element 38, finds a low impedance path through the collector-emitter junction of member 38 and a diode member 42 to ground 63. It is this low impedance path between the control wire 18*e* and ground 63 which is the regenerated and stored ground of the present invention. As will be further discussed, the on-off control of each of the switch members 38 associated with each of the switching means 21–25 is accomplished with a combination of logic involving a common enabling input voltage 26 in conjunction with a particular permutation of momentary grounds on input selecting wires 11*a*–11*e***.

The voltage control switch 38 is capable of being switched bistably between "on" and "off" by the application of current to the base 40 which acts as the gate. In the embodied circuit of FIGURE 2, only the turn-on capability of gate 40 is used. Turn-off of this type of element can be accomplished by lowering the voltage on collector 39, and this latter expedient will be employed. It should here be mentioned that the particular type of PNPN voltage control switch illustrated in FIGURE 2 is not a limiting factor as concerns the present invention. The illustrated switch is a type 2N764 which exhibits low current switching capabilities found desirous for the particular embodiment. The voltage controlled switch elements 38 might equally as well be voltage controlled rectifiers of a type including gate, collector, and emitter elements.

The collector 39 of element 38 is connected through a resistor 36 and capacitor 35 to a common B+ bus 30. Resistor 36 is shunted by a diode member 37, the anode of which connects to the collector of element 38. The base of element 38 is connected through a resistance 34 to ground 63 and through a diode member 33 to a common enable voltage bus 31. The emitter 41 of element 38 connects through a Zener diode 42 to ground 63, through a diode member 43 to the associated input selecting line **11*e*, and through a resistor 44 to the common B+ line 30. The controlled wire output 18*e* from the switching member 21 is connected to the collector 39 of the switching element 38, and, as described above, is provided with a low impedance path through element 38 to ground 63 during conducting periods of element 38**.

Considering the circuit of FIGURE 2 in general, the inputs to the circuit are seen to be an enable voltage 26 and a plurality of input selecting wires **11*a*–11*e*, each of which ties to one of the switching means 21–25. As aforedescribed, the selecting wires 11*a*–11*e*, under the control of a remote selector control 10, are provided with various permutations of momentary grounds as digit code information. The controlled wire outputs of the circuit are the output lines 18*a*–18*e***, and the output information is in the form of various ones of these output lines having low impedance ground returns as defined by the associated switching element being rendered conductive.

Operation of the circuit might first be described with respect to the functioning provided by the enable input voltage 26. Enable input voltage 26 is applied to the circuit through a Zener diode 27 and resistors 46 and 47 to a common enable bus 31. Zener diode 27 may be chosen such that any voltage on the enable input line 26 below a predetermined value defined by the threshold of Zener diode 27 will not effect enabling. A further Zener diode 45 is connected from the junction of resistors 46 and 47 to ground to control the enable voltage 26 within the limits made necessary by the affects of temperature and the spread of turn-off and turn-on characteristics of the various switching elements 38. The presence of enable voltage on the enable bus 31 biases the gates 40 of each of switching elements 38 such that each of the switches is capable of responding to a selecting wire momentary ground as on wire **11*e* to switching means 21. Thus, in regard to switching means 21, the enable voltage is taken from bus 31 through diode 33 to ground 63 so as to forward bias the base or gate of switch element 38. The application of enable voltage 26 further sends a pulse of current by way of R-C network 64–65 to the base of a transistor 28 to momentarily turn on transistor 28. When transistor 28 is turned on the voltage on collector 39 of switching element 38 is lowered through the interconnection of collector 39 through capacitor 35 to the collector of transistor 28. Switch element 38 is turned off at this instant provided its associated selecting wire 11*e* is not grounded. It is noted that the collector of transistor 28 is tied to an erase control bus 32, and each of the switching means 21–25 is similarly connected to the erase control bus 32. Thus, the application of the enable voltage 26 to those of switching means 21–25 which are conducting and whose associated input selecting wire 11***a*–11*e* is not ground at the instant, will turn off the associated switching element 38 to accomplish an erase function. The application of the enable voltage 26 further provides through line 66 a B+ voltage for a further transistor 29 which is responsive to selecting wire ground changes only when the enable signal is applied. The functioning of transistor 29 will be further discussed.

Turn-on of any of the switching means 21–25 is accomplished by grounding the corresponding selecting wire 11*a*–11*e* in the presence of an enable input voltage 26. Thus, with reference to switch 21, the application of a momentary ground on selecting wire 11*e* during the time of application of the enable voltage 26 lowers the voltage on emitter 41 of switching element 38 below the value supplied by the enable source 26 and allows the proper gate current to flow in element 38 to turn the element on. A similar action occurs for others of switching means 22–25 whose selector input lines 11 are grounded during the application of the enable input voltage 26.

Since all of the switching means 21–25 are enabling from a common enable bus 31, each is connected to the bus 31 through a diode 33 such that the gate element 40 of each of the switching elements 38 is isolated from changes in voltage on the other gates during switching operations.

Since each of the switching elements 38 in the switching means 21–25 is turned off by lowering the voltage on collector 39 from a common tie-in with the erase control bus 32, a diode member 37 is provided to isolate the collectors 39 from one another.

The remaining control logic function is accomplished by means of transistor 29 which, as above described, utilizes the enabled voltage 26 as a B+ source. In order to accomplish the necessary function that the further application of selecting wire grounds with the maintenance of the enable voltage 26 erases the previously selected ground permutation by turning off all switches whose selecting wires are not grounded, each of the input selecting wires 11*a* to 11*e* is connected through a capacitor 48–52 to the base of transistor 29 so as to momentarily turn on transistor 29 and in turn apply a positive pulse through capacitor 58 to the base of the erase control transistor 28 to turn on transistor 28. The negative-going pulse on the collector of transistor 28 lowers the voltage on all of the collectors 39 of switching elements 38 and thus turns off those ones whose selecting wires 11*a*–11*e* are ungrounded in a manner identical to that described in conjunction with the application of the enable pulse 26.

Each of the switching means 21–25 is biased off in the absence of enable pulse 26, by means of a Zener diode 42 connected between the emitter 41 of the switching element 38 and ground. The B+ source 30 through resistor 44 provides a reverse bias.

In order that switching transients from input selecting lines 11*a*–11*e* do not interfere with the desired function sequence each of the lines 11*a*–11*e* is provided with a filter capacitor 58–62 to ground.

The digit memory circuit of the present invention, as embodied in FIGURE 2 is thus seen to provide the necessary logic switching functions to regenerate and retain until erased, ground returns for external control functions in response to momentary ground permutations on input selecting lines which may be shared in common with a further plurality of such digit memory circuits.

Although the present invention has been described with respect to a particular embodiment thereof it is not to be so limited so as changes might be made therein to fall within the intended scope of the invention as defined in the appended claims.

I claim:

1. A digit memory circuit for regenerating and storing digital input information defined by predetermined permutations of momentarily grounded ones of a plurality *m* of input select lines, where *m* is an integer comprising a plurality *m* of voltage controlled logic switching means each of which is associated with one of said input select lines and one of a plurality *m* of output control lines, a source of enabling voltage applied in common to each of said switching means as a first input, each of said switching means receiving one of said input select lines as a second input, an erase control line connected in common to each of said switching means as a third input, each of said output control lines being connected to ground through the associated one of said switching means upon said associated one of said switching means being activated, each of said switching means being activated and thereby connecting to ground the associated one of said output control lines in response to the simultaneous application of said first and second inputs, wherein the application of said second input is defined as the grounding of the associated input select line, each of said switching means being deactivated in response to application of said first input in the absence of the application of said second input, means developing said third erase control line input as the output generated by further logic switching circuitry, said further logic switching circuitry receiving said enabling voltage as a first input and said input select lines as paralleled second inputs, said further logic switching means being responsive to the simultaneous application of its first input and any one of its second inputs to provide an erase voltage output.

2. A digital memory circuit as defined in claim 1 wherein each of said switching means comprises a voltage controlled switching element having gate, emitter, and collector electrodes, said enabling voltage source connected to said gate electrode, said erase control line connected to said collector electrode, one of said plurality of input select lines connected to said emitter electrode, one of said plurality of output control lines connected to said collector electrode, means for reverse biasing the emitter-gate junction of said switching element to render said element non-conductive, said emitter electrode being ground referenced, said switching element being rendered conductive to thereby reference said collector electrode and the associated output control line to ground in response to the simultaneous application of said enabling voltage source to said gate electrode and a ground on the input select line connected to said emitter electrode, said switching element being rendered non-conductive upon the subsequent application of said enable voltage source in the absence of a ground on the input select line connected to said emitter electrode.

3. A digital memory circuit as defined in claim 2 wherein said further logic switching circuitry for development of said erase control voltage comprises first and second transistor switching means, said first transistor having a base element connected individually to each of said input select lines through a coupling capacitor, the emitter electrode of said first transistor connected to said enabling voltage source, said first transistor being rendered conductive by the simultaneous presence of said enabling voltage source and a ground on any one of said input select lines, said enabling voltage and the output of said first transistor applied as inputs to the base electrode of said second transistor, said second transistor being rendered conductive in response to either of said base input signals being applied, the collector element of said second transistor being connected to said erase control line to thereby reduce the potential of said erase control line during conduction periods of said second transistor.

4. A digital memory circuit as defined in claim 3 further including diode isolating elements connected between each of said switching element collector electrodes and said erase control line and between each of said switching element gate electrodes and said enabling voltage source.

5. A digital memory circuit as defined in claim 4 further including capacitor means connected between each of said input select lines and ground and between said enabling voltage source and ground to effect switching transient elimination.

6. A digital memory circuit as defined in claim 5 further including means associated with said enabling voltage source input whereby voltage present thereon with amplitude beneath a predetermined minimum is ineffective as concerns the operation of the associated switching means, and further means associated with said enabling voltage source input whereby said enabling voltage as applied to said switching means is held to a predetermined maximum amplitude.

No references cited.

ARTHUR GAUSS, *Primary Examiner*.